3,646,215
HEPTADECANOL FOR MEDICAL PURPOSES
Walt Phillips, Newark, N.J., assignor to
Commodity Improvements, Inc.
No Drawing. Filed Nov. 26, 1969, Ser. No. 880,392
Int. Cl. A61k 27/00
U.S. Cl. 424—343                                    9 Claims

ABSTRACT OF THE DISCLOSURE

Heptadecanol has been found useful for medical purposes to reduce pain and promote rapid healing. The heptadecanol may be applied to the affected parts of the human or animal body by any conventional means, in its pure form or in a solvent.

BACKGROUND

Heptadecanol is a generic name for the several isomeric forms of the aliphatic alcohol having the empirical formula $C_{17}H_{35}OH$. It is usually produced commercially in the branched form 3,9-diethyl-6-hydroxyl tridecane, which has the structure,

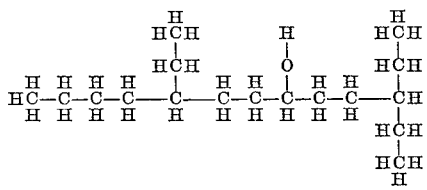

but other isomers are known, as is the straight chain compound, n-heptadecanol. The above isomer is a mild-colored, stable liquid, and is soluble in ethyl alcohol, ether, and many hydrocarbons. It is not readily oxidized and hence does not turn rancid through oxidation or polymerization. Heptadecanol has been used in the past chiefly for the synthesis of more complex organic materials as an intermediate in the manufacture of plasticizers, perfume fixatives, wetting agents and detergents. The heptadecyl alcohol is useful as an antifoaming agent, especially where high temperatures are encountered and the more volatile antifoaming agents would be lost by evaporation. Its sodium sulfate derivative is a powerful wetting agent. Heptadecanol has also been disclosed to be useful as an additive for fuels (see U.S. Pat. 3,211,539).

It is an object of the present invention to provide for new uses of heptadecanol and its derivatives.

A further object of this invention is a method of using heptadecanol and its derivatives for medical purposes.

An object of this invention is to provide a method and compositions for reducing pain and promoting rapid healing with heptadecanol and its derivatives.

The objectives of this invention are set forth in detail in the following description of this inventon.

Heptadecanol has been found useful for applcation to affected parts of the human or animal body to reduce pain by desensitization and by decreasing surface tension to stop irritation, to promote rapid healing and to act as a muscle relaxant. The term "heptadecanol" used throughout this disclosure and claims is intended to encompass both normal and branched chain heptadecanols, and primary, secondary and tertiary alcohols.

The heptadecanol may be applied to the human body in its chemical pure form or as a technical grade compound containing a minor proportion of impurities such as adjacent homologues. Heptadecanol as well as its derivatives may be used in the present invention, such as the heptadecyl esters, ethers, ketones and aldehydes. In the ester, ether and ketone derivatives the total number of carbon atoms in the chain is preferably twenty or less.

For example, the reaction product of heptadecanol with ethanol, propylene glycol, and glycerine, and isopropanol.

The heptadecanol is virtually insoluble in water and soluble in many alcohols. It may be applied as an emulsion or in solution. Surprisingly, adjacent homologues of heptadecanol do not exhibit the properties as are disclosed herein for the heptadecanol. Thus, the 16- and 18- carbon alcohols do not provide the advantages of the present invention although they might exist as minor impurities without detrimental effects.

The manner of applying the heptadecanol to the affected area of the body may be by direct application topically, or massage or by means of a spray or in any other manner.

Heptadecanol and its derivatives are suitable for therapeutic uses in medicine, surgery, ortho-rhinology, dentistry, dermatology and veterinary medicine.

This invention relates to the external topical use of heptadecanol and by direct application in surgical procedures preferably in its chemically pure state or diluted with a suitable solvent such as a hydrocarbon. The heptadecanol may be used in or with propylene glycol, ethanol, glycerine, olive oil, lanolin, sun tan lotion, petrolatums, white precipitate ointment (ammoniated mercury ointment) and antibiotics. The heptadecanol is applied over affected parts to reduce pain by desensitization and by decreasing surface tension. The heptadecanol is a harmless compound which does not produce side or toxic effects and is nonirritating to the human or animal body. It is even safe to use for newborn babies.

The heptadecanol has no bactericidal properties and therefore proper bactericidal agents must be employed at all times. Heptadecanol is stable and not photosensitive and can be sterilized without decomposition. It provides for faster closure of wounds and reduces pain and swelling of various origins but should be used in conjunction with classic known therapy.

The heptadecanol may be applied to provide relief for arthritis, chest pains caused by a coronary attack, acute pain of the inner ear, toothaches, fractures, skin diseases and irritation, orthopedic surgery, etc.

This invention will be described in greater detail in connection with the following specific examples in which a commercal grade of heptadecanol was used. The heptadecanol was the 3,9-diethyl-6 hydroxyl tridecane which was fractionated under vacuum to remove 10–15% from the top and bottom of the fractionation. The remainder (the middle fraction) was treated with sulfuric acid, then neutralized with an alkali (sodium hydroxide), and then washed with water and refractionated to remove the bottom 10%. The remaining top 90% fraction was then used in the following examples.

In the treatment of arthritis the heptadecanol may be applied daily over the affected parts, after several days used, let several days lapse and then repeat its use. Relief is almost immediate.

In chest pains resulting from coronary attack a single external application together with the usual classic treatment has been found to be of significant value.

The acute pain of the inner ear when no infection was present, a few drops of heptadecanol was applied to the inner ear. The pain ceased immediately.

To relieve the pain of toothaches and associated inflammation of the gums, the heptadecanol may be applied on the gums in conjunction with proper dental care as determined by a dentist. The swelling was reduced. The heptadecanol may also be used over the painful area both before and after extraction. The cavity will close sooner than usual and postoperative pain will be lessened.

In treating fractures the heptadecanol should be sprayed over the affected area. The pain will be lessened immediately and the fracture will heal sooner. It is also useful for sprains.

It has been found that the heptadecanol is of great value both during and after surgery. In the treatment of a patient after a hemorrhoidectomy the pain and sensitivity is markedly reduced upon application of heptadecanol to the sensitive area. This treatment leads to rapid healing and it has been found that the patient may be discharged within 24 hours after surgery.

In eczema, poison ivy, erithema, pruritus ani and vulvae, acne, and similar dermatological problems it has been found that the irritation stops immediately upon application of heptadecanol and the healing process is more rapid.

Heptadecanol was compared with cortisone in the treatment of eczema in dogs and the heptadecanol was found to be faster acting without side effects. It stopped irritation immediately and the wound healed overnight.

Novocaine was injected into the back of a dog and it was observed to be noticeably in pain. When the same procedure was repeated with another dog except that heptadecanol was applied before injecting the novocaine, the injection did not produce any observable discomfort to the dog.

Heptadecanol is a very satisfactory adjuvant muscle relaxant when massaged into painful areas. An emulsified heptadecanol, to make it water compatible, is also helpful when used in bathing for balneo-therapy.

Heptadecanol was used after correctivve surgery in which a damaged hip joint was replaced with an aluminum alloy ball which in part affected adjacent nerves. After a single application the patient was able to walk for the first time without pain.

The heptadecanol was subjected to the following toxicity tests: Ten mice were fed .0005 cc. each of heptadecanol; six guinea pigs were fed .066 cc. of heptadecanol and a dog was fed .025 cc. of the heptadecanol. All animals were fed the above amounts emulsified in sesame oil by a stomach tube. After the one feeding the animals were observed after one hour, three hours, eight hours, twenty-four hours, forty-eight hours and seventy-two hours. All animals were sacrificed after seventy-two hours and examined for any abnormally. All animals survived the seventy-two hours without any observable toxic effects. At necropocy no abnormalcy was noted in any organs in the pericardial, thoracic and abdominal cavities. The brain and central nervous systems also appeared normal.

Further toxicity tests were conducted as follows: Six rats each weighing 250 grams, received .0055 cc. of heptadecanol five days each week for a total of twenty feedings. Six guinea pigs, each weighing 300 grams, received .0066 cc. of heptadecanol five days each week for a total of twenty feedings. No deaths occurred during the twenty feedings. All animals appeared normal. At necropcy all of the animals were examined and no abnormalities were noted. The organis in the pericardial, thoracic and abdominal cavities were normal in size, shape and appearance. The brain and central nervous system also were normal.

Heptadecanol has also been found to ease neck pains when massaged into the painful area.

Heptadecanol may be applied to a person's fingernails in order to prevent brittleness and strengthen the nails. A single application had been found of value in the treatment of nails that crack and chip easily.

The amount of heptadecanol normally employed in its pure form is an amount sufficient to cover the affected area. This is normally sufficient to achieve the desirable results of the present invention. However, repeated application of the same amount are beneficial witihin a few hours after the initial treatment or on a daily basis depending upon the acuteness of the problem. When applied in a solvent or emulsion greater amounts may be used particularly by massaging the affected area or by repeated applications.

This invention has been described in terms of specific embodiments set forth in detail in conjunction with the above descriptive matter. Alternative embodiments will be apparent to those skilled in the art in view of this discuosure, and accordingly such modifications are to be contemplated within the spirit of the invention as disclosed and claimed herein.

I claim:
1. The method of treating humans or animals to reduce pain, promote rapid healing, and to stop irritation around or on an affected area which comprises externally applying to said area an affective amount of heptadecanol.
2. The method of claim 1 in which the heptadecanol is used with a solvent, or in an emulsion.
3. The method of claim 1 in which the heptadecanol is applied to the nails of a human or animal body.
4. A method of claim 1 in which the heptadecanol is applied to a painful area of the human body as a muscle relaxant.
5. The method of claim 1 in which the heptadecanol is applied to teeth or gums.
6. The method of claim 1 in which the heptadecanol is applied to the painful area of the human body caused by a bone injury.
7. The method of claim 1 in which heptadecanol is applied to the skin to relieve the irritation and promote the healing due to dematological problems.
8. The method of claim 1 in which the heptadecanol is 3,9-diethyl-6-hydroxyl tridecane.
9. The method of claim 1 in which the heptadecanol is n-heptadecanol.

References Cited

Chem. Abt. 54—19456B (1960).

STANLEY J. FRIEDMAN, Primary Examiner